United States Patent
Guo et al.

(10) Patent No.: US 8,612,619 B2
(45) Date of Patent: Dec. 17, 2013

(54) METHOD AND APPARATUS FOR IMPROVED MULTICAST STREAMING IN WIRELESS NETWORKS

(75) Inventors: Katherine H. Guo, Eatontown, NJ (US); Arun Narayen Netravali, Westfield, NJ (US); Krishan K. Sabnani, Westfield, NJ (US)

(73) Assignee: Alcatel Lucent, Paris (FR)

( * ) Notice: Subject to any disclaimer, the term of this patent is extended or adjusted under 35 U.S.C. 154(b) by 563 days.

(21) Appl. No.: 11/396,230

(22) Filed: Mar. 31, 2006

(65) Prior Publication Data

US 2007/0233889 A1    Oct. 4, 2007

(51) Int. Cl.
   *G06F 15/16* (2006.01)

(52) U.S. Cl.
   USPC ........... 709/231; 709/228; 370/392; 370/231; 370/332; 455/452.2; 455/450

(58) Field of Classification Search
   USPC .......... 370/389–392, 432, 329; 709/201–203, 709/227–231, 246–247, 200; 455/24, 63.1, 455/69, 303, 450–452.2, 522
   See application file for complete search history.

(56) References Cited

U.S. PATENT DOCUMENTS

| | | | |
|---|---|---|---|
| 6,339,450 B1 | 1/2002 | Chang et al. | |
| 6,339,540 B1 | 1/2002 | Lavi | |
| 6,996,104 B2 * | 2/2006 | Trossen et al. | 370/390 |
| 7,346,007 B2 * | 3/2008 | Curcio et al. | 370/252 |
| 7,366,195 B2 * | 4/2008 | Hwang | 370/432 |
| 7,415,241 B2 * | 8/2008 | Oprescu-Surcobe et al. | 455/3.05 |
| 7,904,581 B2 * | 3/2011 | Sherer et al. | 709/231 |
| 7,907,952 B2 * | 3/2011 | Lee et al. | 455/452.2 |
| 7,961,700 B2 * | 6/2011 | Malladi et al. | 370/345 |
| 2003/0157899 A1 | 8/2003 | Trossen et al. | |
| 2004/0076332 A1 | 4/2004 | Lin et al. | |
| 2004/0166863 A1 | 8/2004 | Kim et al. | |
| 2004/0215802 A1 * | 10/2004 | Amini et al. | 709/231 |
| 2004/0240568 A1 * | 12/2004 | Lundby et al. | 375/259 |

(Continued)

FOREIGN PATENT DOCUMENTS

| | | |
|---|---|---|
| CN | 1728788 | 2/2006 |
| EP | 1 528 832 A | 5/2005 |

(Continued)

OTHER PUBLICATIONS

McCanne et al., "Receiver-driven Layered Multicast", Proceedings of ACM SIGCOMM '96, p. 117 to 130, 1996.*

(Continued)

*Primary Examiner* — Greg C Bengzon
(74) *Attorney, Agent, or Firm* — Wall & Tong, LLP (57) ABSTRACT

The invention includes a method and apparatus for providing multimedia content to a plurality of wireless terminals. The method includes transcoding an original media stream to form at least one companion media stream, each media stream having a different data rate, and advertising each media stream to each of the plurality of wireless terminals, each wireless terminal having an associated channel condition. The original media stream and at least one companion media stream are each adapted for being selected by each of the wireless terminals. For each wireless terminal selecting one of the media streams, the selected one of the media streams is selected using the data rates of the media streams and the channel condition of the wireless terminal. The transcoding of the media stream to form the at least one companion media stream may be performed using channel condition information.

20 Claims, 9 Drawing Sheets

(56) References Cited

U.S. PATENT DOCUMENTS

| | | | |
|---|---|---|---|
| 2005/0180415 A1* | 8/2005 | Cheung et al. | 370/389 |
| 2006/0268873 A1* | 11/2006 | Tonjes et al. | 370/392 |
| 2006/0274712 A1* | 12/2006 | Malladi et al. | 370/345 |
| 2007/0133449 A1* | 6/2007 | Schacht et al. | 370/312 |
| 2007/0177555 A1* | 8/2007 | Brueck et al. | 370/338 |
| 2008/0045228 A1* | 2/2008 | Zhang et al. | 455/450 |
| 2008/0064429 A1* | 3/2008 | Park | 455/503 |
| 2008/0098446 A1* | 4/2008 | Seckin et al. | 725/114 |
| 2008/0102749 A1* | 5/2008 | Becker | 455/3.06 |
| 2008/0212583 A1* | 9/2008 | Rey et al. | 370/390 |

FOREIGN PATENT DOCUMENTS

| | | |
|---|---|---|
| WO | WO 02/052860 A | 7/2002 |
| WO | WO 2004/040830 A | 5/2004 |
| WO | WO 2004/046968 A2 | 6/2004 |

OTHER PUBLICATIONS

PCT Search Report corresponding PCT/US2007/006755, Aug. 22, 2007, Lucent Technologies Inc.
A, Vetro et al., Video Transcoding Architectures and Techniques: An Overview: IEEE Signal Processing Magazine, Mar. 2003, pp. 18-29.
Communication from Examining Division in EP 07 753 388.3-1525, Lucent Technologies Inc., Applicant, mailed Apr. 16, 2010, 4 pages.
Communication from Examining Division in EP 07 753 388.3-1525, Lucent Technologies Inc., Applicant, mailed Jan. 16, 2012, 4 pages.
May 8, 2012 Office Action in Japanese Patent Application No. 2009-502845, Alcatel-Lucent USA Inc., Applicant, 5 pages.
Jan. 29, 2012 Office Action in CN Application No. 200780011809.2, Lucent Technologies Inc., Applicant, 10 pages.
Jul. 23, 2013 Notice of Preliminary Rejection in KR Patent Application No. 2008-7024011, Alcatel-Lucent USA Inc., Applicant, 3 pp.

* cited by examiner

METHOD AND APPARATUS FOR IMPROVED MULTICAST STREAMING IN WIRELESS NETWORKS

FIELD OF THE INVENTION

The invention relates to the field of communication networks and, more specifically, to multicast streaming of multimedia content in wireless networks.

BACKGROUND OF THE INVENTION

To distribute streaming multimedia content to multiple mobile devices, service providers typically use the cost-effective broadcast multicast architecture of Third Generation (3G) wireless networks. Within a multicast group, mobile terminals are heterogeneous in terms of terminal capability and channel condition. In order to satisfy all mobile terminals in a multicast group, the existing 3G broadcast multicast framework determines a multicast channel data rate for the multicast group based on channel conditions of mobile terminals located at the cell edge. In other words, in the existing 3G broadcast multicast framework, the multicast channel data rate for a multicast group is limited by the mobile terminal in the multicast group with the worst channel condition. Although this existing framework ensures adequate wireless coverage within the cell, mobile terminals with good channel condition (e.g., mobile terminals located close to the Base Transceiver Station) are deprived use of a high channel data rate for a better multimedia experience.

SUMMARY OF THE INVENTION

Various deficiencies in the prior art are addressed through the invention of a method and apparatus for providing multimedia content to a plurality of wireless terminals. The method includes transcoding an original media stream to form at least one companion media stream, each media stream having a different data rate, and advertising each media stream to each of the plurality of wireless terminals, each wireless terminal having an associated channel condition. The original media stream and at least one companion media stream are each adapted for being selected by each of the wireless terminals. For each wireless terminal selecting one of the media streams, the selected one of the media streams is selected using the data rates of the media streams and the channel condition of the wireless terminal. The transcoding of the media stream to form the at least one companion media stream may be performed using channel condition information.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides transcoding of media streams within wireless networks in order to improve user multimedia experience while efficiently utilizing bandwidth resources. The present invention transcodes an original media stream to form at least one companion media stream. The media streams transport the same multimedia content using different channel data rates. The media streams are associated with respective media groups, each media group supporting a multicast flow adapted for conveying the associated media stream. The media groups (for original and companion media streams) are advertised to wireless terminals, and each wireless terminal dynamically selects one of the media groups and joins the selected one of the media groups in order to receive the media stream using a channel data rate best suited for the channel condition of that wireless terminal. The present invention, for each media group, multicasts the media stream associated with the media group to the wireless terminals in the media group using the associated multicast flow.

The present invention may provide a feedback channel from a wireless terminal to the network to enable the wireless terminal to provide channel condition information adapted for use by the network transcoding the original media stream to form at least one companion media stream. In one embodiment, the channel condition information may be used by the network in determining the number of companion media streams formed by transcoding the original media stream. In one such embodiment, the channel condition information may be used by the network in determining the channel bit rates of the companion media streams formed by transcoding the original media stream. In one embodiment, the operation of the feedback channel from the wireless terminal to the network may operate differently depending upon whether the wireless terminal belongs to the media group associated with the media stream using a channel data rate best suited for the channel condition of the wireless terminal.

As described herein, the media stream using a channel data rate best suited for the channel condition of a wireless terminal may be determined using at least one of a plurality of measures. In one embodiment, a rate best suited for a channel condition is a maximum achievable rate (i.e., rate closest to the available bandwidth of the data channel without exceeding the available bandwidth). In one embodiment, a rate best suited for a channel condition is a rate for which packet loss is minimized. Although described herein with respect to specific measures by which a rate of a media stream may be considered best suited for a channel condition, various other measures by which a rate of a media stream may be considered best suited for a channel condition may be used.

Figure 1:
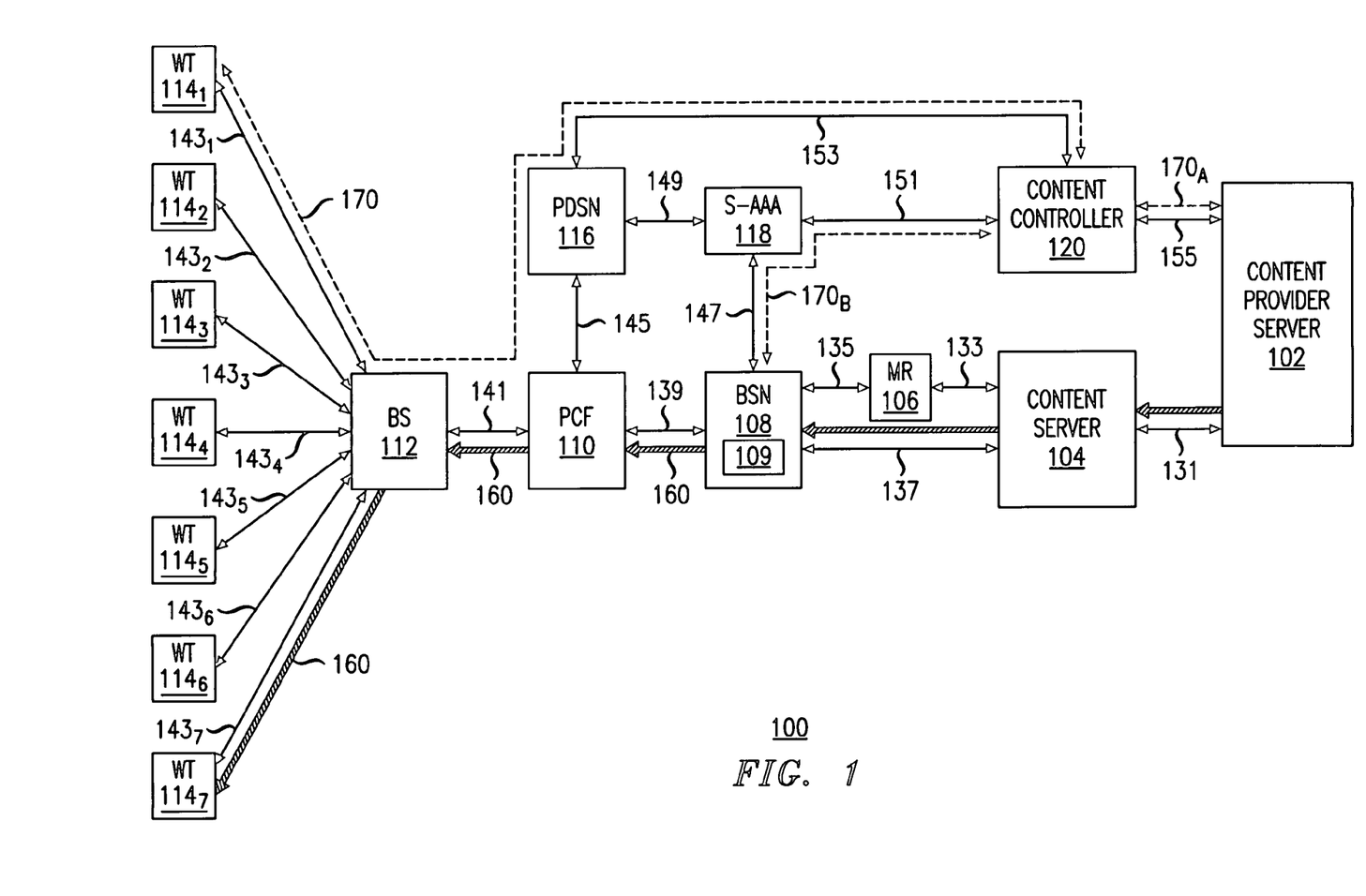
FIG. 1 depicts a high-level block diagram of logical components of a communication network.

FIG. 1 depicts a high-level block diagram of a communication network. In general, communication network 100 of FIG. 1 comprises a communication network supporting broadcast multicast services for wireless terminals. Specifically, communication network 100 of FIG. 1 includes a content provider server (CPS) 102, a content server (CS) 104, a multicast router (MR) 106, a broadcast serving node (BSN) 108, a packet control function (PCF) 110, a base station (BS) 112, a plurality of wireless terminals (WTs) $114_1$-$114_7$ (collectively, WTs 114), a packet data serving node (PDSN) 116, a Serving Authentication, Authorization, Accounting server (S-AAA) 118, and a content controller (CC) 120. As depicted in FIG. 1, PCF 110, BS 112, and WTs 114 operate as a radio access network (RAN).

As depicted in FIG. 1, CPS 102 and CS 104 communicate using a link 131. In one embodiment, CS 104 and BSN 108 communicate using a unicast path 137 which may be a direct link or, alternatively, may include multiple unicast links connected by unicast routers (not depicted) between CS 104 and BSN 108. In one embodiment, CS 104 and BSN 108 communicate using a multicast path 133 from CS 104 to MR 106 and a multicast path 135 from MR 106 to BSN 108. Although depicted as an indirect multicast path between CS 104 and BSN 108, in one embodiment, a direct multicast path may be used between CS 104 and BSN 108. Although not depicted, in one embodiment, one or both of multicast paths 133 and 135 may include multiple multicast paths connected by other routers between CS 104 and MR 106 or MR 106 and BSN 108, respectively.

As depicted in FIG. 1, BSN 108 and PCF 110 communicate using a link 139, and PCF 110 and BS 112 communicate using a link 141. As depicted in FIG. 1, BS 112 and WTs $114_1$-$114_7$ communicate using a plurality of wireless links (WLs) $143_1$-$143_7$ (collectively, WLs 143), respectively. As depicted in FIG. 1, PCF 110 and PDSN 116 communicate using a link 145, S-AAA 118 and BSN 108 communicate using a link 147, S-AAA 118 and PDSN 116 communicate using a link 149, S-AAA and CC 120 communicate using a link 151, CC 120 and PDSN 116 communicate using a link 153, and CC 120 and CPS 102 communicate using a link 155.

As depicted in FIG. 1, CPS 102 provides multimedia content (e.g., audio content, video content, and the like) to CS 104. In one embodiment, CPS 102 provides real-time multimedia content. In one embodiment, CPS 102 stores multimedia content. In one embodiment, content may be provided as programs. In one embodiment, CPS 102 is maintained by a third party provider. In one embodiment, CPS 102 streams content to CS 104. In one embodiment, CPS 102 provides content to CS 104 in response to control signals received from CC 120. In one embodiment, control signals received by CPS 102 from CC 120 may originate from WTs 114 (e.g., content requests initiated by users associated with WTs 114). In this embodiment, signaling originating from WTs 114 may traverse a signaling path originating on WTs 114, traversing BS 112, PCF 110, and PDSN 116, and terminating on CC 120.

As depicted in FIG. 1, CS 104 receives content from CPS 102. The CS 104 encodes multimedia content for transmission to BSN 108 over the core network. In one embodiment, CS 104 provides real-time video encoding of live programs and pre-processed video encoding of scheduled programs. In one embodiment, CS 104 applies application level forward error correction (FEC) to encoded video streams. As depicted in FIG. 1, CS 104 streams content from CPS 102 to BSN 108 (and, optionally, other BSNs (not depicted for purposes of clarity)). In embodiment, CS 104 streams a highest quality media stream (denoted as an original media stream) to BSN 108 so that the highest quality media stream may be transcoded into different streams having different levels of quality (lower levels of quality that the original media stream received from CS 104). In one embodiment, CS 104 streams the highest quality media stream to BSN 108 for each multicast group. The BSN 108 receives the streaming content from CS 104.

As depicted in FIG. 1, CS 104 may stream content to BSN 108 directly (using a unicast connection between CS 104 and BSN 108) or indirectly (using a unicast connection between CS 104 and MR 106 and a multicast connection between MR 106 and BSN 108). In one embodiment, transmission (unicast or multicast) of content from CS 104 to BSN 108 is performed using Internet Protocol (IP) and Real Time Protocol (RTP). In one embodiment, CS 104 distributes content to BSN 108 using IP multicast (where BSN 108 functions as one of the leaves of the IP multicast tree (and, optionally, other BSNs (not depicted for purposes of clarity) function as other leaves of the IP multicast tree). In one embodiment, CS 104 distributes content to BSN 108 using unicast over dedicated IP tunnels between CS 104 and BSN 108 (and, optionally, other BSNs).

As depicted in FIG. 1, BSN 108 multicasts content to WTs 114. The BSN 108 transmits multicast traffic to PCF 110. In one embodiment, BSN 108 transmits the multicast traffic to PCF 110 using an A10 interface. The PCF 110 transmits multicast traffic to BS 112. In one embodiment, PCF 110 transmits the multicast traffic to BS 112 using an A8 interface. The BS 112 includes a base station controller and at least one base transceiver station controlled by the base station controller. The BS 112 transmits the multicast traffic to WTs 114. In one embodiment, BSN 108 only transcodes and advertises a media stream in response to a request by one or more of WTs 114. In one such embodiment, BSN 108 only transcodes and advertises a media stream in response to a threshold number of requests by WTs 114. In one embodiment, BSN 108 transcodes the original media stream to form the at least one companion media stream using feedback received from WTs 114.

As depicted in FIG. 1, BSN 108 includes a transcoder 109 adapted for transcoding an original media stream conveying given multimedia content to form at least one companion media stream conveying the given multimedia content of the original media stream. The respective bit rates of the media streams are different for each of the media streams. The respective bit rates of the companion media stream(s) is equal to or less than the bit rate of the original media stream. In one embodiment, physical layer data rate associated with each of the media streams is determined by the application layer data rate. The media streams are associated with respective media groups. The media groups are associated with respective multicast flows (i.e., each wireless terminal in a media group receives the associated multicast flow conveying the media stream associated with the media group).

As depicted in FIG. 1, for the given multimedia content, BSN 108 advertises each of the media groups (media streams, multicast flows) to each of the WTs 114. As depicted in FIG. 1, each WT 114 may select one of the media groups, the selected one of the media groups associated with the media stream using a channel data rate best suited for the channel condition of the WT. The WTs 114 dynamically join the respective selected media groups. The BSN 108 multicasts the media streams to WTs 114 belonging to the respective media groups using multicast flows associated with the media groups (i.e., each media stream is multicast over a different multicast tree using a different multicast flow associated with a different media group). The WTs 114 may join and leave the media groups (and, therefore, the associated multicast flows) dynamically.

In one embodiment, a content identifier uniquely identifies multimedia content conveyed by related media streams (i.e., an original media stream and at least one companion media stream formed from the original media stream). In one embodiment, a multicast flow identifier uniquely identifies the multicast flows conveying the related media streams (i.e., the multicast flow identifier is unique across the related media streams associated with given multimedia content). In one embodiment, the content identifier is embedded within the media group identifier. In this embodiment, WTs 114 may identify specific content using the content identifier, and may select one of the media groups (i.e., the multicast flow conveying an associated one of the media streams) using the multicast flow identifier. In one embodiment, identification of respective media streams, media groups, and multicast flows may be substantially equivalent determinations.

As depicted in FIG. 1, a data channel 160 conveys multimedia content from CPS 102 to WT 114$_7$. As depicted in FIG. 1, data channel 160 traverses a path including CPS 102, CS 104, MR 106 (optionally), BSN 108, PCF 110, BS 112, and WT 114$_7$. As depicted in FIG. 1, a control channel 170, including control channel portions 170$_A$ and 170$_B$, conveys control information between WTs 114 and communication network 100. As depicted in FIG. 1, control channel 170 traverses a path including WT 114$_1$, BS 112, PCF 110, PDSN 116, and CC 120, control channel portion 170$_A$ traverses a path including CC 120 and CPS 102, and control channel portion 170$_B$ traverses a path including CC 120, S-AAA 118, and BSN 108. The WTs 114 may be adapted to process data signals and control signals associated with such data channels and control channels.

As depicted in FIG. 1, WTs 114 include wireless terminals operable for receiving, processing, presenting, and transmitting wireless signals adapted for conveying various information, including voice content, multimedia content, control signals and the like, as well as various combinations thereof. In one embodiment, WTs 114 comprise mobile handsets. In one embodiment, in which communication network 100 is implemented as a CDMA2000 1xRTT network, WTs 114 may be denoted as mobile stations (MSs). In one embodiment, in which communication network 100 is implemented as a CDMA2000 EvDO network or CDMA2000 HRPD network, WTs 114 may be denoted as access terminals (ATs). Although primarily described herein with respect to mobile handsets, various other wireless devices may be used in accordance with the present invention.

The WTs 114 operate as presentation devices. The WTs 114 include user interfaces. The WTs 114 are operable for processing received information (e.g., voice communication, audio clips, video clips, and the like) for presentation via the user interface (e.g., speaker, screen, and the like). The WTs 114 are operable for processing information (e.g., voice communications, pictures, and the like) captured via the user interface (e.g., microphone, camera, and the like) for transmission towards the network. Although not depicted, WTs 114 may include various other control modules, communication modules, processor modules, input-output modules, and the like, as well as various combinations thereof. In one embodiment, control channels may be implemented between WTs 114 and network components (illustratively, CC 120, BSN 108, and the like) for performing various control functions.

In one embodiment, WTs 114 may utilize control channels for conveying control signals adapted for controlling multimedia content received by WTs 114. In one embodiment, the control signals may include commands entered by users via user interfaces of WTs 114. In one embodiment, control signals adapted for controlling multimedia content may be transmitted from WTs 114 to CC 120. In one embodiment, control signals adapted for controlling multimedia content received by WTs 114 may traverse a signaling path from WTs 114 to CC 120 that traverses BS 112, PCF 110, and PDSN 116 (illustratively, control channel 170). In one embodiment, control channels between WTs 114 and CC 120 may be implemented as bidirectional unicast IP connections. In one such embodiment, WTs 114 may retrieve information (e.g., content, session, and the like) from CC 120 using Transmission Control Protocol (TCP) and Hypertext Transfer Protocol (HTTP).

As depicted in FIG. 1, CC 120 processes control signals received from WTs 114. The CC 120 signals CPS 102 according to commands conveyed by the control signals received from WTs 114 (illustratively, using control channel portion 170$_A$). In one embodiment, in which control signals received from WTs 114 include requests for multimedia content, CC 120 may request that CPS 102 begin streaming requested multimedia content (e.g., a requested audio clip, video clip, and the like) towards WTs 114. In one embodiment, in which control signals received from WTs 114 include requests for executing trick-play functions (e.g., rewind, fast-forward, pause, and the like) on streaming multimedia content, CC 120 may request that CPS 102 provide trick-play functions for multimedia content streaming from CPS 102 to WTs 114. Although specific control functions are described, CC 120 may support various other functions for controlling CPS 102.

In one embodiment, WTs 114 may utilize control channels for conveying control signals adapted for providing channel condition information associated with respective data channels by which WTs 114 receive media streams conveying multimedia content. In one embodiment, channel condition information associated with each of the WTs 114 may include at least one channel condition parameter (e.g., at least one of a current bit rate, a current packet loss rate, and the like, as well as various combinations thereof). In one embodiment, channel condition information may be used for controlling transcoding of original media streams to form associated companion media streams, thereby controlling quality of multimedia content received by WTs 114. In one embodiment, control signals adapted for controlling quality of multimedia content may be transmitted from WTs 114 to BSN 108.

In one embodiment, depicted and described herein with respect to FIG. 1, control signals adapted for controlling quality of multimedia content may be transmitted from WTs 114 to BSN 108 using control channels originating on WTs 114, traversing BS 112, PCF 110, PDSN 116, CC 120, S-AAA 118, and terminating on BSN 108. For example, as depicted in FIG. 1, control channel 170 is established between WT 114$_1$ and CC 120 (traversing BS 112, PCF 110, and PDSN 116), and associated control channel portion 170$_B$ is established between CC 120 and BSN 108 (traversing S-AAA 118). In one embodiment, depicted and described herein with respect to FIG. 5, control signals adapted for controlling quality of multimedia content may be transmitted from WTs 114 to BSN 108 using an interface between PDSN 116 and BSN 108.

As depicted in FIG. 1, communication network 100 is implemented as a Third Generation Partnership Project Two (3GPP2) Code Division Multiple Access 2000 (CDMA-2000) network. In one embodiment, communication network 100 may be implemented as one of a CDMA2000 One Times Radio Transmission Technology (1xRTT) network, a CDMA2000 Evolution Data Optimized (EVDO) network, a CDMA2000 High Rate Data Packet (HRDP) network, and the like. Although primarily depicted and described herein with respect to a CDMA2000 network, in one embodiment, communication network 100 may be implemented as a Third Generation Partnership Project (3GPP) Universal Mobile Telecommunications System (UMTS) network. Although primarily depicted and described with respect to 3GPP and 3GPP2 networks, in one embodiment, communication network 100 may be implemented using various other networking technologies.

As depicted in FIG. 1, communication network 100 of FIG. 1 is adapted for conveying multimedia content from a content provider (illustratively, CPS 102) to wireless terminals (illustratively, WTs 114). In general, 3GPP2 networks support Broadcast Multicast Service (BCMCS) and 3GPP networks support Multimedia Broadcast Multicast Services (MBMS). In general, multicast is an efficient means of transmitting the identical content to multiple receivers while minimizing network resource usage, supporting a wide range of multimedia services for wireless networks. In general, multimedia services such as live television, news summaries, sports highlights, local traffic and weather reports, and the like, as well as various combinations thereof, may be efficiently delivered (scheduled or on-demand) to wireless terminals using broadcast multicast.

Although 3GPP, 3GPP2, and like networking standards depicted and described with respect to FIG. 1 define specific configurations of network components suggested for providing specific functionality, such standards typically specify logical configurations of network components (leaving physical implementations unspecified). As depicted in FIG. 1, communication network 100 comprises a specific configuration in which each logical component is implemented as a standalone physical component. In one embodiment, depicted and described herein with respect to FIG. 2, various combinations of logical network components depicted and described herein with respect to FIG. 1 may be implemented using other combinations of physical network components.

Figure 2:
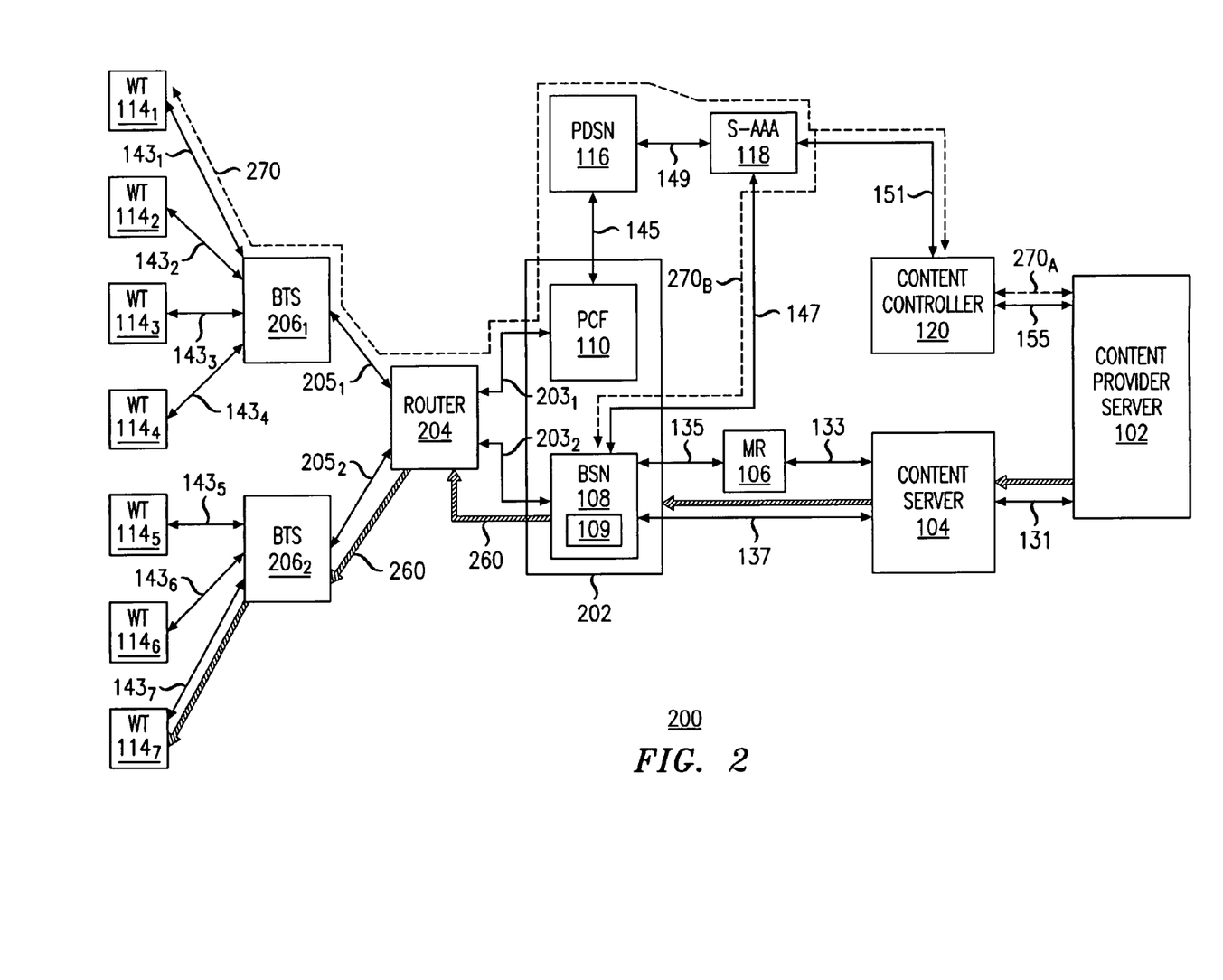
FIG. 2 depicts a high-level block diagram of a physical implementation of the communication network of FIG. 1.

FIG. 2 depicts a high-level block diagram of a physical implementation of the communication network of FIG. 1. Specifically, with some exceptions, physical communication network 200 of FIG. 2 is substantially similar to logical communication network 100 of FIG. 1. As depicted in FIG. 2, BSN 108 and PCF 110 may be implemented as portions of a base station controller (e.g., radio network controller (RNC)). As depicted in FIG. 2, BSN 108 and PCF 110 communicate with WTs 114 using a router 204 and a plurality of base transceiver stations (BTSs) $206_1$-$206_2$ (collectively, BTSs 206). As depicted in FIG. 2, BSN 108 and PCF 110 communicate with router 204 using links $203_1$ and $203_2$ (collectively, links 203), respectively, and router 204 communicates with BTSs $206_1$ and $206_2$ using links $205_1$ and $205_2$ (collectively, links 205), respectively. As depicted in FIG. 2, BTSs $206_1$ and $206_2$ communicate with WTs $114_1$-$114_4$ and $114_5$-$114_7$, respectively.

As depicted in FIG. 2, a data channel 260 (similar to data channel 160 depicted and described herein with respect to FIG. 1) conveys multimedia content from CPS 102 to WT $114_7$. As depicted in FIG. 2, data channel 260 traverses a path including CPS 102, CS 104, MR 106 (optionally), BSN 108, router 204, BTS $206_2$, and WT $114_7$. As depicted in FIG. 2, a control channel 270 including control channel portions $270_A$ and $270_B$ (similar to control channel 170 and control channel portions $170_A$ and $170_B$ depicted and described herein with respect to FIG. 1), conveys control information between WT $114_1$ and communication network 200. As depicted in FIG. 1, control channel 270 traverses a path including WT $114_1$, BTS $206_1$, router 204, PCF 110, PDSN 116, S-AAA 118, and CC 120.

Although primarily depicted and described herein with respect to specific network configurations of network components, network functions, communication links, data flows, control flows, and the like, the present invention may be implemented using various other network configurations of network components, network functions, communication links, data flows, control flows, and the like, as well as various combinations thereof. Although, for purposes of clarity, depicted and described with respect to one base station (illustratively, BS 112), in one embodiment, BSN 108 may multicast a plurality of multicast flows (associated with related media streams) over a plurality of base stations serving respective pluralities of wireless terminals.

Figure 3:
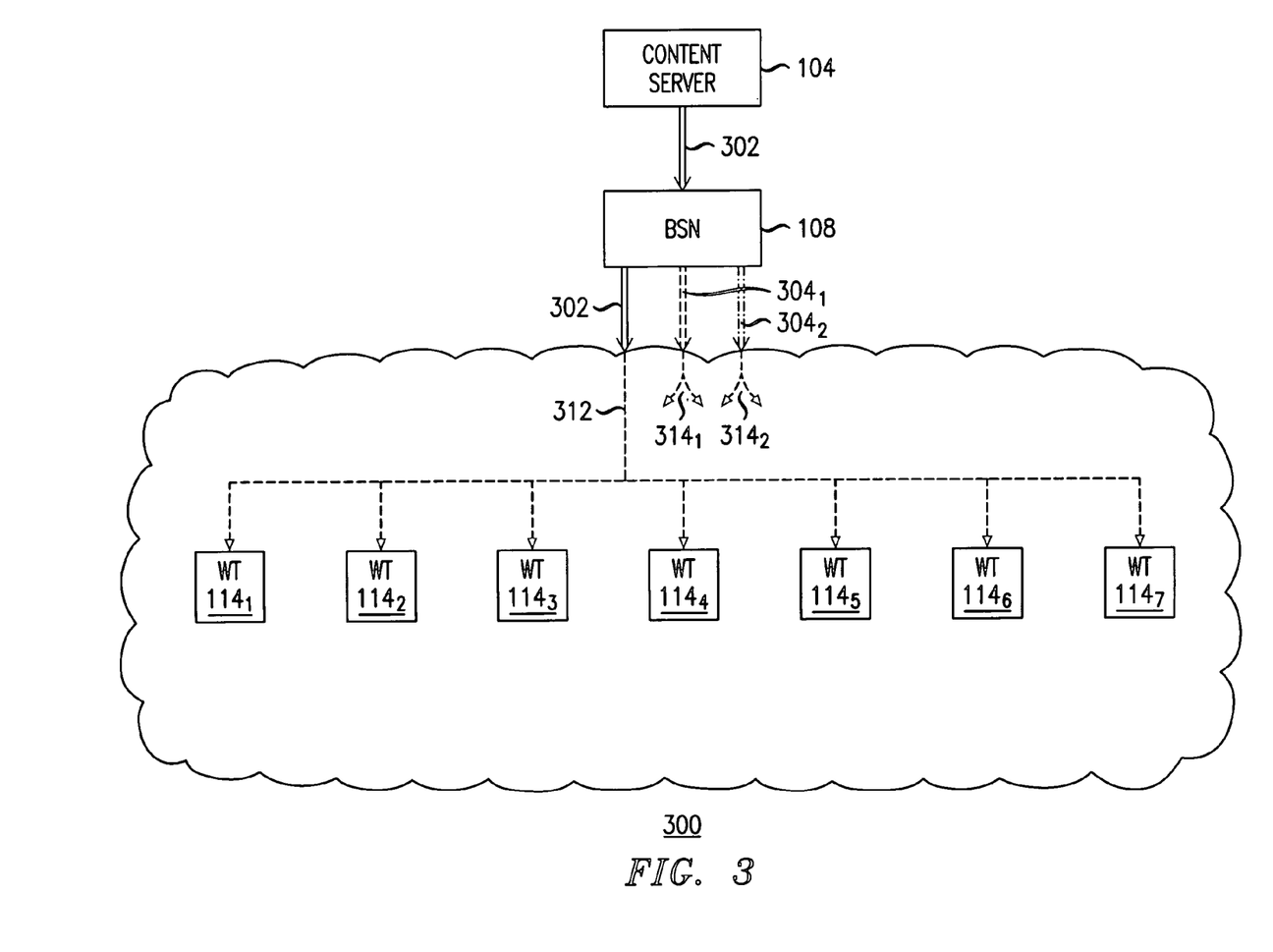
FIG. 3 depicts a high-level block diagram of a portion of the communication network of FIG. 1 in which transcoding of an original media stream is performed to form companion media streams.

FIG. 3 depicts a high-level block diagram of a portion of the communication network of FIG. 1 in which transcoding of an original media stream is performed to form companion media streams. As depicted in FIG. 3, CS 104 streams an original media stream 302 to BSN 108. The BSN 108 transcodes original media stream 302 to form a plurality of companion media streams $304_1$ and $304_2$ (collectively, companion media streams 304). The bit rates of original media stream 302 and companion media streams 304 may be denoted as $r_0$, $r_1$, and $r_2$, respectively. The bit rates of original media stream 302 and companion media streams 304 satisfy the following: $r_0 > r_1 > r_2$.

As depicted in FIG. 3, BSN 108 advertises original media stream 302 to each of WTs 114 using original advertisement signals 312. Although specific advertisement signals between for companion media streams 304 have been omitted for purposes of clarity, BSN 108 advertises companion media streams $304_1$ and $304_2$ to each of the WTs 114 using companion advertisement signals $314_1$ and $314_2$ (collectively, companion broadcast control signals 314), respectively. In one embodiment, control signals 312 and 314 advertise media groups or multicast flows (as a proxy for media stream). The original advertisement signals 312 and companion advertisement signals 314 may be collectively referred to as advertisement signals. In one embodiment, each advertisement signal includes a multicast flow identifier, a content identifier, and data rate information.

As described herein, for given multimedia content, each original advertisement signal 312 includes the same multicast flow identifier (e.g., flow 10100), each companion advertisement signal $314_1$ includes the same multicast flow identifier (e.g., flow 10101), and each companion advertisement signal $314_2$ includes the same multicast flow identifier (e.g., 10102); however, the multicast flow identifiers vary across advertisement signals 312, $314_1$, and $314_2$, respectively (e.g., 10100, 10101, and 10102, respectively). As described herein, for given multimedia content, the content identifier is identical for advertisement signals 312, $314_1$ and $314_2$. In one embodiment, advertisement signals 312, $314_1$, and $314_2$ advertise specific data rates $r_0$, $r_1$, and $r_2$, respectively. In one embodiment, control signals 312, $314_1$ and $314_2$ advertise data rate ranges $[\geq r_0]$, $[r_0 \geq r_1]$ and $r_2$, respectively.

Figure 4:
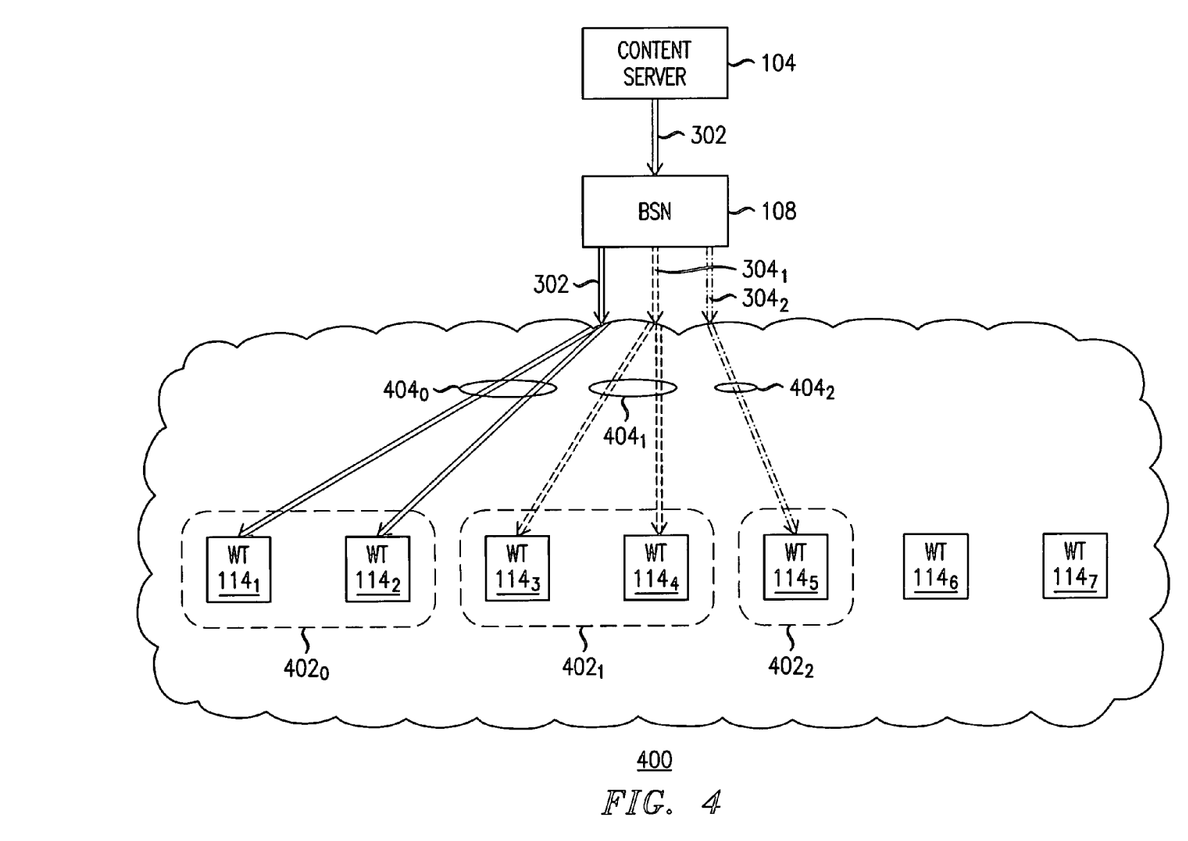
FIG. 4 depicts a high-level block diagram of a portion of the communication network of FIG. 1 including media groups formed for providing the original and companion media streams of FIG. 3.

FIG. 4 depicts a high-level block diagram of a portion of the communication network of FIG. 1 including media groups formed for providing the media streams of FIG. 3. As depicted in FIG. 4, WTs $114_1$ and $114_2$ joined a media group $402_0$ associated with original media stream 302 in response to respective determinations that original media stream 302 is using a channel data rate ($r_0$) best suited for the channel conditions of WTs $114_1$ and $114_2$. As depicted in FIG. 4, WTs $114_3$ and $114_4$ joined a media group $402_1$ associated with companion media stream $304_1$ in response to respective determinations that companion media stream $304_1$ is using a channel data rate ($r_1$) best suited for the channel conditions of WTs $114_3$ and $114_4$. As depicted in FIG. 4, WT $114_5$ joined a media group $402_2$ associated with companion media stream $304_2$ in response to a determination that companion media stream $304_2$ is using a channel data rate ($r_2$) best suited for the channel condition of WT $114_5$.

As depicted in FIG. 4, BSN 108 multicasts original media stream 302 to WTs $114_1$ and $114_2$ in media group $402_0$ using a corresponding multicast flow $404_0$. As depicted in FIG. 4, BSN 108 multicasts companion media stream $304_1$ to WTs $114_3$ and $114_4$ in media group $402_1$ using a corresponding multicast flow $404_1$. As depicted in FIG. 4, BSN 108 multicasts companion media stream $304_2$ to WT $114_5$ in media group $402_2$ using a corresponding multicast flow $404_2$. The multicast flows $404_0$-$404_2$ are collectively denoted as multicast flows 404. As described herein, multicast flows 404.

Although omitted for purposes of clarity, WTs 114 may dynamically join existing media groups, leave existing media groups, switch between existing media group, switch between an existing media group and a newly formed media group, and perform like dynamic changes in response to various conditions (including channel condition changes). In one example, WT $114_1$ leaves media group $402_0$ (e.g., user associated with WT $114_1$ is done viewing the multimedia content). In one example, WT $114_7$ joins media group $402_1$ (e.g., user associated with WT $114_7$ requests multimedia content conveyed by media streams 302 and 304). In one example, WT $114_2$ switches from media group $402_0$ to media group $402_2$ (e.g., in response to a significant degradation of the channel condition of WT $114_2$).

Figure 5:
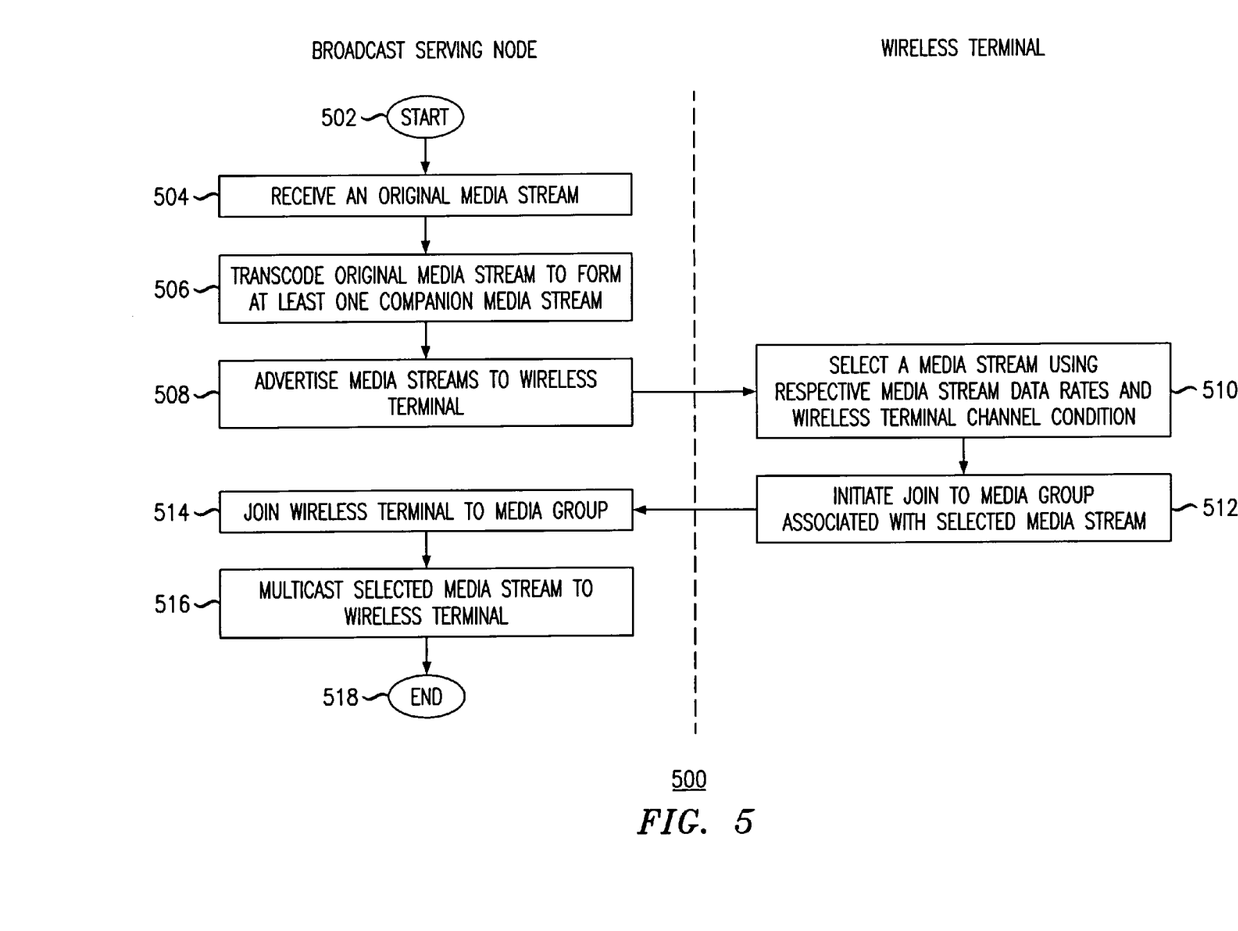
FIG. 5 depicts a method according to one embodiment of the present invention.

FIG. 5 depicts a method according to one embodiment of the present invention. Specifically, method 500 of FIG. 5 depicts a method for transcoding an original media stream to form at least one companion media stream, thereby enabling wireless terminals to select media streams using rates best suited for respective channel conditions of the wireless terminals. Although, for purposes of clarity, depicted and described with respect to one wireless terminal, portions of method 500 depicted and described as being performed by the wireless terminal may be performed by a plurality of wireless terminals. Although depicted as being performed serially, those skilled in the art will appreciate that at least a portion of the steps of method 500 may be performed contemporaneously, or in a different order than presented in FIG. 5. The method 500 begins at step 502 and proceeds to step 504.

At step 504, an original media stream is received. At step 506, the original media stream is transcoded to form at least one companion media stream. As described herein, each media stream has a different channel data rate. At step 508, the media streams (including the original media stream and the at least one companion media stream) are advertised to the wireless terminal. In one embodiment, each media stream is advertised to the wireless terminal using a media group. In one embodiment, each media stream is advertised to the wireless terminal using a multicast flow. In one embodiment, each media stream is advertised to the wireless terminal using a content identifier (e.g., BCMCS program identifier) and a multicast flow identifier (e.g., BCMCS multicast IP flow identifier).

At step 510, a media stream is selected using respective media stream data rates associated with the media streams and wireless terminal channel condition associated with the wireless terminal. In one embodiment, in which the media stream is advertised using an associated media group, a media group may be selected by the wireless terminal. In one embodiment, in which the media stream is advertised using an associated multicast flow, a multicast flow may be selected by the wireless terminal. At step 512, a join to the media group associated with the selected media stream is initiated by the wireless terminal. At step 514, the wireless terminal is joined to the media group associated with the selected media stream. At step 516, the selected media stream is multicast to the wireless terminal (as well as to any other wireless terminals belonging to the media group). At step 518, method 500 ends.

Figure 6:
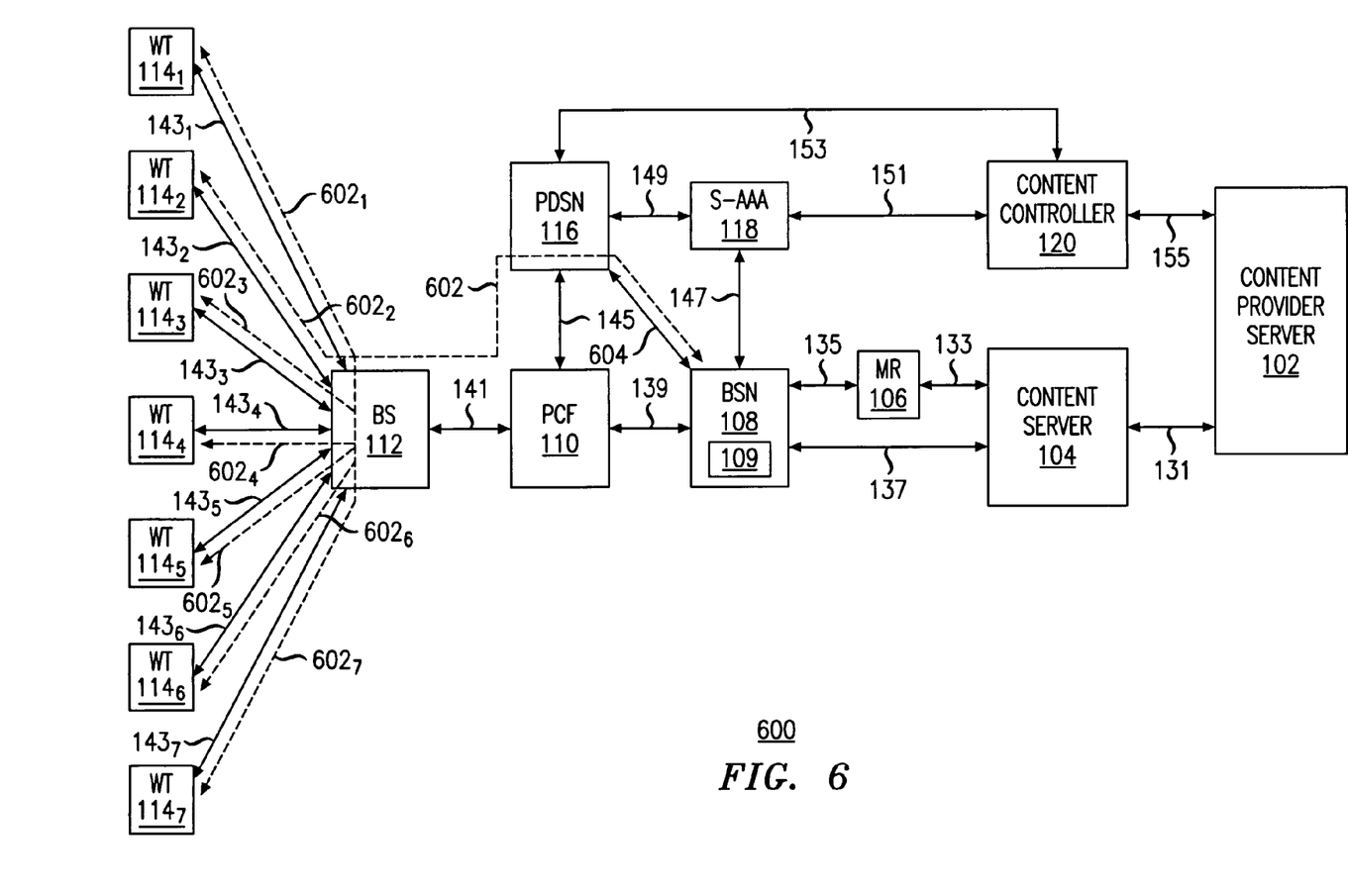
FIG. 6 depicts a high-level block diagram of the logical components of the communication network of FIG. 1 including a feedback channel conveying channel conditions for use in media stream transcoding.

FIG. 6 depicts a high-level block diagram of the logical components of the communication network of FIG. 1 including a feedback channel conveying information for use in media stream transcoding. As depicted in FIG. 6, a plurality of feedback channels $602_1$-$602_7$ (collectively, feedback channels 602) is established between WTs $114_1$-$114_7$, respectively, and BSN 108. As depicted in FIG. 6, feedback channels 602 traverse BS 112, PCF 110, and PDSN 116 between WTs 114 and BSN 108. As depicted in FIG. 6, an interface 604 is established between PDSN 116 and BSN 108 for supporting feedback channels 602. In one embodiment, information conveyed using feedback channels 602 includes channel condition information adapted for use in media stream transcoding (e.g., for determining the number of companion media streams required to be formed by transcoding an original media stream, for determining respective data rates of the companion media streams, and the like, as well as various combinations thereof).

As depicted in FIG. 6, in one embodiment, feedback information may be conveyed from WTs 114 to BSN 108 using existing control channels traversing BS 112, PCF 110, PDSN 116, CC 120, and S-AAA 118. In one such embodiment, a bidirectional unicast IP connection may be established between WTs 114 and CC 120, and an additional connection (traversing S-AAA 118) may be established from CC 120 to BSN 108. Since such existing control channels between WTs 114 and BSN 108 generally utilize a heavyweight protocol (e.g., Hypertext Transfer Protocol (HTTP) over Transmission Control Protocol (TCP)) on the bidirectional unicast IP connection between WTs 114 and CC 120, as well as on the additional connection traversing S-AAA 118), such existing control channels may not be optimal for providing real-time feedback information detected by WTs 114 to BSN 108 for use in media stream transcoding.

Figure 7:
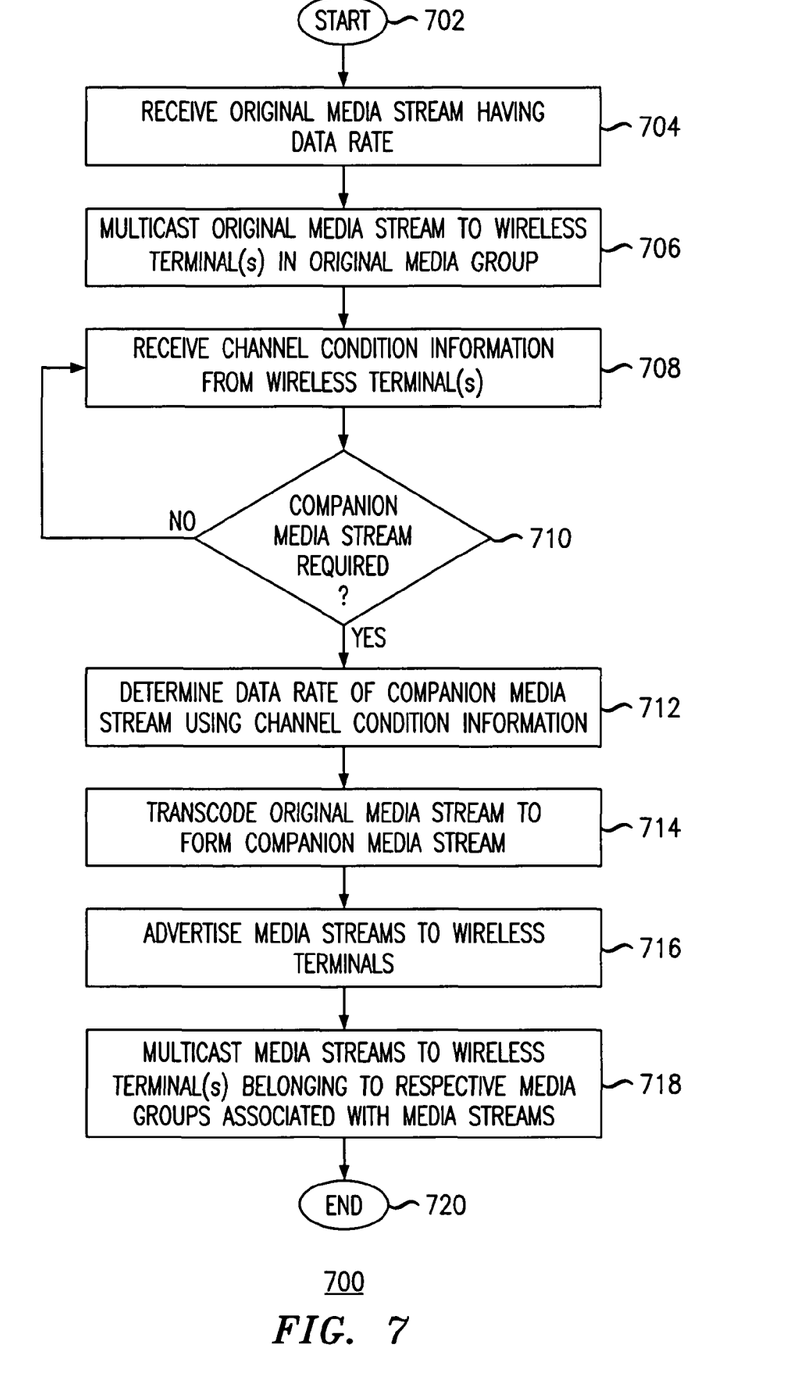
FIG. 7 depicts a method according to one embodiment of the present invention.

FIG. 7 depicts a method according to one embodiment of the present invention. Specifically, method 700 of FIG. 7 depicts a method for dynamically transcoding an original media stream to form a companion media stream. For purposes of clarity, FIG. 7 depicts transcoding an original media stream to form one companion media stream, however, as described herein, an original media stream may be transcoded to form a plurality of companion media streams. Although depicted as being performed serially, those skilled in the art will appreciate that at least a portion of the steps of method 700 may be performed contemporaneously, or in a different order than presented in FIG. 7. The method 700 begins at step 702 and proceeds to step 704.

At step 704, an original media stream having a data rate $r_O$ is received. Although described with respect to a data rate, in one embodiment, rate $r_O$ may include a bit rate. At step 706, the original media stream is multicast to wireless terminal(s) in an original media group (i.e., wireless terminal(s) initiating a request for the content conveyed by the original media stream). Although, as depicted and described with respect to FIG. 1, the original media stream is multicast prior to transcoding of the original media stream, in one embodiment, transcoding of the original media stream to form at least one companion media stream may be performed prior to multicasting of the original or companion media streams. In one such embodiment, the original and companion media streams may be advertised to wireless terminals prior to any wireless terminals joining media groups associated with the advertised media streams.

At step 708, channel condition information is received from wireless terminals. In one embodiment, channel condition information may be received from wireless terminals receiving the multimedia content. In one embodiment, channel condition information is received from wireless terminals requesting to receive the multimedia content. In one embodiment, channel condition information includes at least one of a current bit rate, a current packet loss rate and the like, as well as various combinations thereof. In one embodiment, channel condition information includes a channel rate range including a high rate and low rate between which media stream rates may be best suited for providing multimedia content to the associated wireless terminal at a highest quality attainable by the wireless terminal under current conditions.

At step 710, a determination is made as to whether a companion media stream is required. In one embodiment, the determination as to whether the companion media stream is required may be performed using the channel condition information. In one embodiment, a companion media stream is identified as being required in response to a determination that a threshold number of wireless terminals (equal to or greater than one) report associated channel condition information indicative that the media stream rate best suited for the channel conditions of the respective wireless terminals is not currently supported by an existing media stream (i.e., not currently supported by the original media stream or any existing companion media streams).

As depicted in FIG. 7, if a companion media stream is not required, method 700 returns to step 708, at which point additional channel condition information is received from wireless terminals. If a companion media stream is required, method 700 proceeds to step 712. At step 712, a data rate of the companion media stream is determined using the channel condition information, e.g., at least one channel condition parameter. At step 714, the original media stream is transcoded to form a companion media stream using the determined data rate. At step 716, the media streams are advertised to wireless terminals. At step 718, the media streams are multicast to wireless terminal(s) belonging to respective media groups associated with the media streams. At step 720, method 700 ends.

For example, assume original media stream having rate $r_0$ is not best suited for the channel conditions of a threshold number of wireless terminals. In this example, assume that each wireless terminal in the threshold number of wireless terminals reports an associated channel condition indicative that a media stream rate $r_1$ ($r_0 > r_1$) is best suited for the channel conditions of the wireless terminals. In this example, a network element (illustratively, BSN 108) transcodes the original media stream using rate $r_0$ to form a companion media stream using rate $r_1$. The network element advertises the original and companion media streams to each of the wireless terminals, thereby enabling each wireless terminal for which media stream rate $r_1$ is best suited for the associated channel condition to join the media group associated with the companion media stream.

Figure 8:
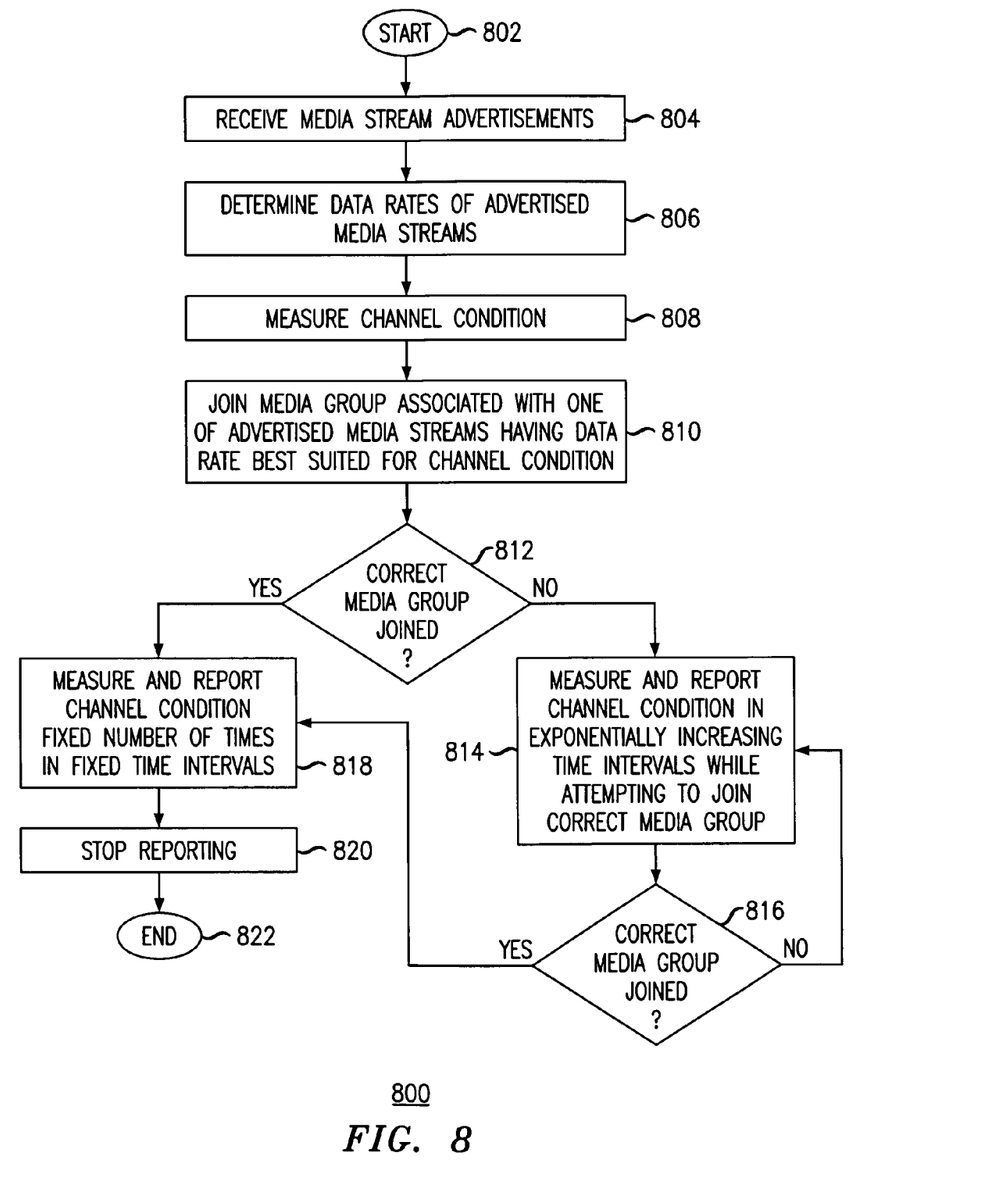
FIG. 8 depicts a method according to one embodiment of the present invention.

FIG. 8 depicts a method according to one embodiment of the present invention. Specifically, method 800 of FIG. 8 depicts a method for providing channel condition information adapted for use in transcoding an original media stream to form at least one companion media stream. For purposes of clarity, FIG. 8 depicts processing associated with a single wireless terminal, however, as described herein, each wireless terminal may provide channel condition information to the network for use in transcoding of media streams. Although depicted as being performed serially, those skilled in the art will appreciate that at least a portion of the steps of method 800 may be performed contemporaneously, or in a different order than presented in FIG. 8. The method 800 begins at step 802 and proceeds to step 804.

At step 804, media stream advertisements are received (for an original media stream and at least one companion media stream formed by transcoding the original media stream). At step 806, respective data rates of the advertised media streams are determined. At step 808, channel condition information associated with the wireless terminal is measured. At step 810, the media group associated with one of the advertised media streams is joined. In one embodiment, the joined media group is associated with the media stream having a data rate best suited for the channel condition of the wireless terminal. As described herein, various measures may be used for determining a media stream rate best suited for a channel condition of a wireless terminal.

At step 812, a determination is made as to whether the wireless terminal joined the correct media group. In one embodiment, a determination as to whether the wireless terminal joined the correct media group is performed by measuring the channel condition and comparing the channel condition and the rate of the media stream associated with the joined media group. In one embodiment, the determination as to whether the wireless terminal joined the correct media group is performed by comparing the channel condition and the respective rates of advertised media streams associated with other media groups not initially selected by the wireless terminal. If the wireless terminal joined the correct media group, method 800 proceeds to step 818. If the wireless terminal joined an incorrect media group, method 800 proceeds to step 814.

At step 814, the wireless terminal measures and reports the channel condition in exponentially increasing time intervals (e.g., measure and report at t, 2t, 4t, 8t, and so on, where t is a unit interval) while attempting to join the correct media group (as determined by channel condition). In other words, the wireless terminal, using signaling with the network, is continuously attempting to join the correct media group, however, as long as the wireless terminal has not joined the correct media group, the wireless terminal measures and reports channel condition in exponentially increasing time intervals. At step 816, a determination is made as to whether the wireless terminal joined the correct media group. If the wireless terminal has joined the correct media group, method 800 proceeds to step 818. If the wireless terminal has not joined the correct media group, method 800 returns to step 814.

At step 818, the wireless terminal measures and reports the channel condition periodically in a fixed number of periodic time intervals (i.e., a fixed number of times in fixed time intervals, e.g., measure and report three times at t, t, t, where t is a unit interval). Although described with respect to measuring and reporting channel condition three times, channel condition may be measured and reported fewer or more times, or using different time intervals. At step 820, the wireless terminal stops reporting channel condition to the network. In one embodiment, although the wireless terminal stops reporting the channel condition to the network, the wireless terminal may continue to measure the channel condition for use in dynamically switching between media groups (i.e., for ensuring that the wireless terminal always belongs to the media group associated with the media stream having a rate best suited for the current channel condition of the wireless terminal. At step 822, method 800 ends.

Although omitted for purposes of clarity, in one embodiment, in which the wireless terminal continues to monitor the associated channel condition, the wireless terminal may determine that the channel condition has changed such that the rate of the media stream associated with the currently selected media group is not best suited for the channel condition. In one such embodiment, the wireless terminal may dynamically switch from the currently selected media group to the media group associated with the media stream having the rate best suited for the channel condition of the wireless terminal. Using the present invention, wireless terminals always receive multimedia content with a highest quality possible for the associated channel condition.

Figure 9:
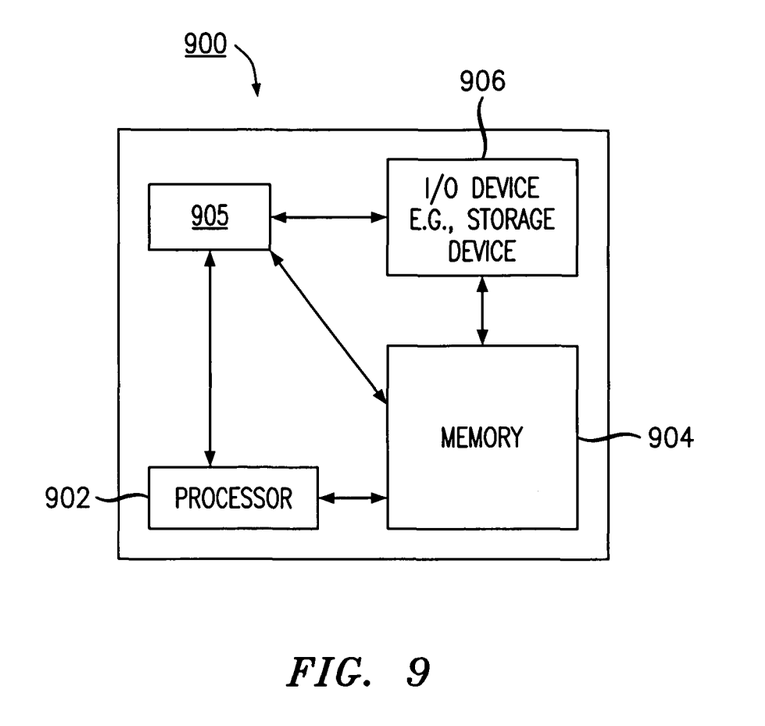
FIG. 9 depicts a high-level block diagram of a general-purpose computer suitable for use in performing the functions described herein.

FIG. 9 depicts a high-level block diagram of a general-purpose computer suitable for use in performing the functions described herein. As depicted in FIG. 9, system 900 comprises a processor element 902 (e.g., a CPU), a memory 904, e.g., random access memory (RAM) and/or read only memory (ROM), a media stream transcoding module 905, and various input/output devices 906 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present media stream transcoding module or process 905 can be loaded into memory 904 and executed by processor 902 to implement the functions as discussed above. As such, media stream transcoding process 905 (including associated data structures) of the present invention can be stored on a computer readable medium or carrier, e.g., RAM memory, magnetic or optical drive or diskette and the like.

Although primarily depicted and described herein with respect to a 3GPP2 CDMA2000 1xRTT network in which a BSN performs media stream transcoding, advertising, multicasting, and the like, in one embodiment, media stream transcoding, advertising, multicasting, and the like, as well as other functions, as well as various combinations thereof may be performed by other network elements within 3GPP2 CDMA2000 networks, within other 3GPP2 CDMA2000 networks (e.g., EvDO, HRPD, and the like), within other 3G networks (e.g., 3GPP UMTS networks), within other wireless-based networks, and the like, as well as various combinations thereof. For example, in one embodiment, at least a portion of the functions of the present invention depicted and described herein with respect to BSNs may be performed by Gateway GPRS Support Nodes (GGSNs) in 3GPP UMTS networks.

Although various embodiments which incorporate the teachings of the present invention have been shown and described in detail herein, those skilled in the art can readily devise many other varied embodiments that still incorporate these teachings.

What is claimed is:

1. A method for providing multimedia content from a broadcast serving node (BSN), comprising:
    receiving, at the BSN, channel condition information associated with respective channel conditions of a threshold number of wireless terminals and indicative that a first data rate of an original media stream conveying the multimedia content is unsuitable for the channel conditions of the wireless terminals;
    identifying a second data rate suitable for the channel conditions of the wireless terminals;
    transcoding the original media stream at the BSN to form a companion media stream conveying the multimedia content and having the second data rate, wherein the first data rate of the original media stream is greater than the second data rate of the companion media stream;
    advertising the original and companion media streams in a manner adapted for enabling a wireless terminal to select one of the original and companion media streams based on the respective first and second data rates of the original and companion media streams and a channel condition of the wireless terminal, wherein advertising of the original and companion media streams is initiated from the BSN; and
    receiving, at the BSN, channel condition information of the wireless terminal, wherein a frequency with which the channel condition information of the wireless terminal is received is based on a result of a comparison of a measured channel condition of the wireless terminal to a data rate of a media stream of a media group joined by the wireless terminal to determine whether the media group joined by the wireless terminal is a correct media group for the wireless terminal, the correct media group for the wireless terminal being a media group having an associated media stream using a data rate best suited for the channel condition of the wireless terminal.

2. The method of claim 1, wherein transcoding the original media stream comprises:
    determining the first data rate of the original media stream;
    determining the second data rate of the companion media stream; and
    forming the companion media stream according to the second data rate of the companion media stream.

3. The method of claim 1, wherein:
    the channel condition information of the wireless terminal is received in periodic time intervals when the wireless terminal belongs to a correct media group; and
    the channel condition information of the wireless terminal is received in exponentially increasing time intervals when the wireless terminal belongs to an incorrect media group.

4. The method of claim 1, wherein:
    each media stream is advertised using a respective media group;
    each of the media groups has the same content identifier associated therewith, wherein the content identifier identifies the multimedia content; and
    the media groups have different respective flow identifiers associated therewith, wherein the flow identifiers associated with the respective media groups identify the respective media streams of the media groups.

5. The method of claim 4, further comprising:
    receiving, from the wireless terminal, a request to join a selected one of the media groups, the selected one of the media groups associated with the one of the media streams having the largest data rate supportable by the channel condition of the wireless terminal.

6. The method of claim 4, further comprising:
    for each media group, multicasting the associated media stream while at least one wireless terminal belongs to the media group.

7. The method of claim 1, wherein the wireless terminal is adapted to select one of the media streams having a data rate substantially matching the channel condition of the wireless terminal.

8. The method of claim 1, wherein the channel condition of the wireless terminal is specified using at least one channel condition parameter, wherein the at least one channel condition parameter comprises at least one of a bit rate, a data rate, a packet loss rate, or an available bandwidth.

9. An apparatus for providing multimedia content from a broadcast serving node (BSN), comprising:
a processor and a memory communicatively connected to the processor, the processor configured to:
receive, at the BSN, channel condition information associated with a threshold number of wireless terminals and indicative that a first data rate of an original media stream conveying the multimedia content is unsuitable for the channel conditions of the wireless terminals;
identify a second data rate suitable for the channel conditions of the wireless terminals;
transcode the original media stream at the BSN to form a companion media stream conveying the multimedia content and having the second data rate, wherein the first data rate of the original media stream is greater than the second data rate of the companion media stream;
advertise the original and companion media streams in a manner adapted for enabling a wireless terminal to select one of the original and companion media streams based on the respective first and second data rates of the original and companion media streams and a channel condition of the wireless terminal, wherein advertising of the original and companion media streams is initiated from the BSN; and
receive, at the BSN, channel condition information of the wireless terminal, wherein a frequency with which the channel condition information of the wireless terminal is received is based on a result of a comparison of a measured channel condition of the wireless terminal to a data rate of a media stream of a media group joined by the wireless terminal to determine whether the media group joined by the wireless terminal is a correct media group for the wireless terminal, the correct media group for the wireless terminal being a media group having an associated media stream using a data rate best suited for the channel condition of the wireless terminal.

10. A method for use by a wireless terminal for receiving multimedia content at the wireless terminal, the wireless terminal having a channel condition associated therewith, the method comprising:
receiving, at the wireless terminal, advertising information indicative of a plurality of media streams available for selection by the wireless terminal, the media streams comprising an original media stream and a companion media stream, wherein each of the media streams conveys the multimedia content, wherein the original media stream has a first data rate associated therewith and the companion media stream has a second data rate associated therewith, wherein the original and companion media streams are associated with respective media groups, wherein the second data rate of the companion media stream is identified based on a threshold number of wireless terminals reporting associated channel condition information indicative that the first data rate of the original media stream is unsuitable for respective channel conditions of the wireless terminals;
identifying, at the wireless terminal, the first and second data rates of the respective original and companion media streams based on the advertising information;
measuring, at the wireless terminal, a channel condition of the wireless terminal;
initiating, by the wireless terminal, a request to join one of the media groups associated with one of the media streams based on the measured channel condition of the wireless terminal;
determining whether the one of the media groups joined by the wireless terminal is a correct media group for the wireless terminal based on a comparison of a measured channel condition of the wireless terminal to at least one of the data rates of at least one of the respective media streams; and
measuring the channel condition of the wireless terminal and transmitting the measured channel condition of the wireless terminal from the wireless terminal toward a network element, wherein a frequency with which the channel condition of the wireless terminal is transmitted is based on a result of the determination as to whether the one of the media groups joined by the wireless terminal is a correct media group for the wireless terminal, the correct media group for the wireless terminal being one of the media groups having an associated media stream using a data rate best suited for the channel condition of the wireless terminal.

11. The method of claim 10, further comprising:
in response to a determination that the one of the media groups joined by the wireless terminal is the correct media group for the wireless terminal, measuring the channel condition of the wireless terminal and transmitting the measured channel condition of the wireless terminal from the wireless terminal toward the network element in periodic time intervals.

12. The method of claim 10, further comprising:
in response to a determination that the one of the media groups joined by the wireless terminal is not the correct media group for the wireless terminal, measuring the channel condition of the wireless terminal and transmitting the measured channel condition of the wireless terminal from the wireless terminal toward the network element in exponentially increasing time intervals.

13. The method of claim 10, wherein determining whether the one of the media groups joined by the wireless terminal is the correct media group for the wireless terminal comprises:
comparing the measured channel condition of the wireless terminal to the data rate of the media stream of the one of the media groups joined by the wireless terminal.

14. The method of claim 10, further comprising:
extracting the multimedia content from the one of the media streams of the selected one of the media groups joined by the wireless terminal; and
presenting the extracted multimedia content via at least one user interface of the wireless terminal.

15. The method of claim 10, wherein the measured channel condition is adapted for use by the network element in transcoding the original media stream to form the companion media stream.

16. The method of claim 10, wherein:
in response to a determination that the one of the media groups joined by the wireless terminal is not the correct media group for the wireless terminal, the channel condition of the wireless terminal is measured and transmitted in exponentially increasing time intervals while the wireless terminal attempts to join the correct media group for the wireless terminal.

17. The method of claim 16, further comprising:

in response to a determination that the wireless terminal has joined the correct media group during the attempt to join the correct media group, measuring the channel condition of the wireless terminal and transmitting the measured channel condition of the wireless terminal toward the network element in periodic time intervals.

18. A method for providing multimedia content from a Gateway GPRS Support Node (GGSN), comprising:

receiving, at the GGSN, channel condition information associated with respective channel conditions of a threshold number of wireless terminals and indicative that a first data rate of an original media stream conveying the multimedia content is unsuitable for the channel conditions of the wireless terminals;

identifying a second data rate suitable for the channel conditions of the wireless terminals;

transcoding the original media stream at the GGSN to form a companion media stream conveying the multimedia content and having the second data rate, wherein the first data rate of the original media stream is greater than the second data rate of the companion media stream;

advertising the original and companion media streams in a manner for enabling a wireless terminal to select one of the original and companion media streams based on the respective first and second data rates of the original and companion media stream and a channel condition of the wireless terminal, wherein advertising of the original and companion media streams is initiated from the GGSN; and receiving, at the GGSN, channel condition information of the wireless terminal, wherein a frequency with which the channel condition information of the wireless terminal is received is based on a result of a comparison of a measured channel condition of the wireless terminal to a data rate of a media stream of a media group joined by the wireless terminal to determine whether the media group joined by the wireless terminal is a correct media group for the wireless terminal, the correct media group for the wireless terminal being a media group having an associated media stream using a data rate best suited for the channel condition of the wireless terminal.

19. The method of claim 18, wherein:

the channel condition information of the wireless terminal is received in periodic time intervals when the wireless terminal belongs to a correct media group; and the channel condition information of the wireless terminal is received in exponentially increasing time intervals when the wireless terminal belongs to an incorrect media group.

20. The method of claim 1, wherein the BSN transcodes the original media stream to form the companion media stream based on channel condition information received at the BSN via an interface between a packet data serving node (PDSN) and the BSN.

* * * * *